June 12, 1928.

W. C. ELZE 1,673,557

FORGE

Filed June 18, 1927

INVENTOR
Walter C. Elze
BY
ATTORNEY

June 12, 1928.  
W. C. ELZE  
FORGE  
Filed June 18, 1927  
1,673,557  
4 Sheets-Sheet 3
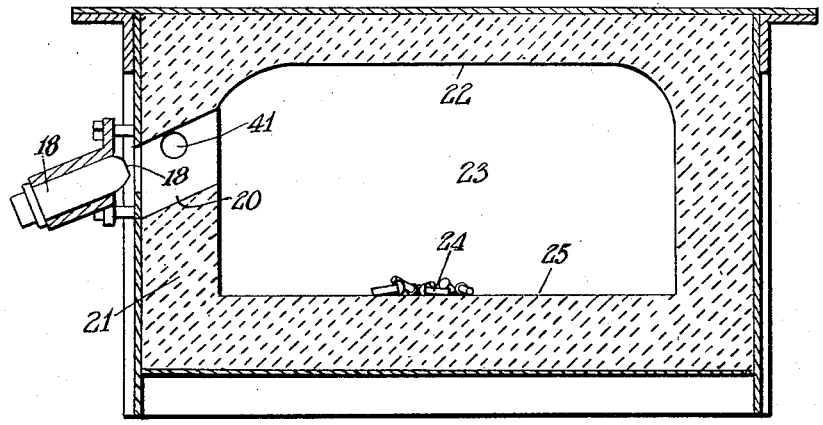
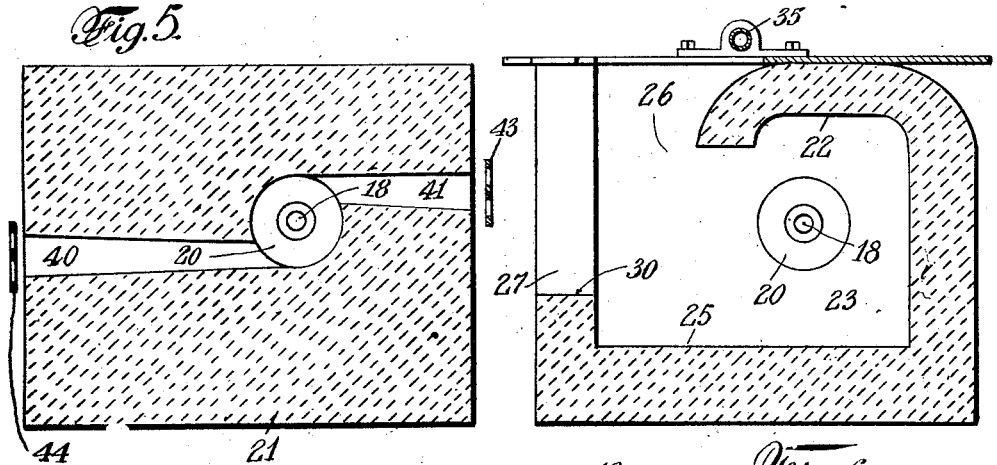
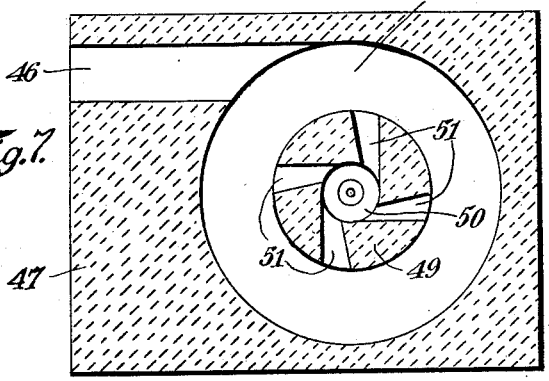

June 12, 1928.                    W. C. ELZE                    1,673,557
                                    FORGE
                              Filed June 18, 1927        4 Sheets-Sheet 4
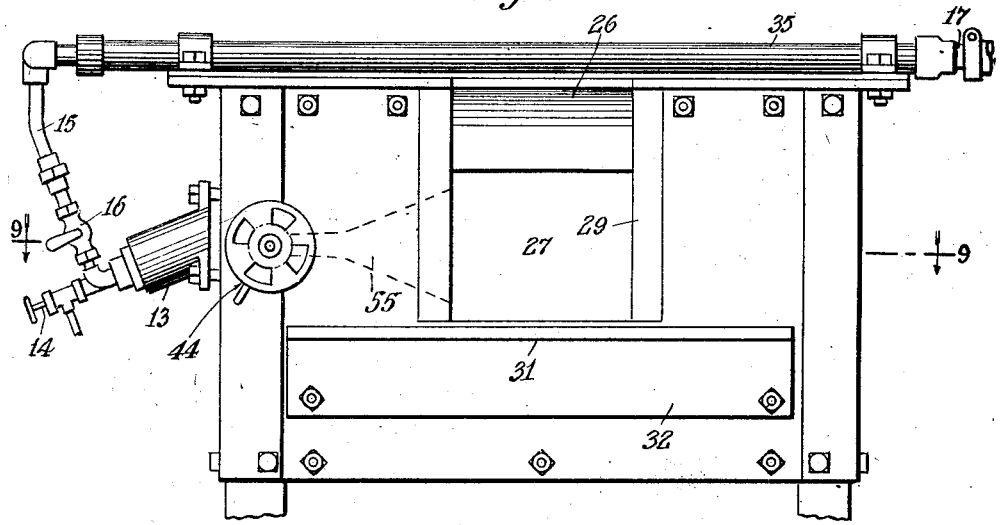
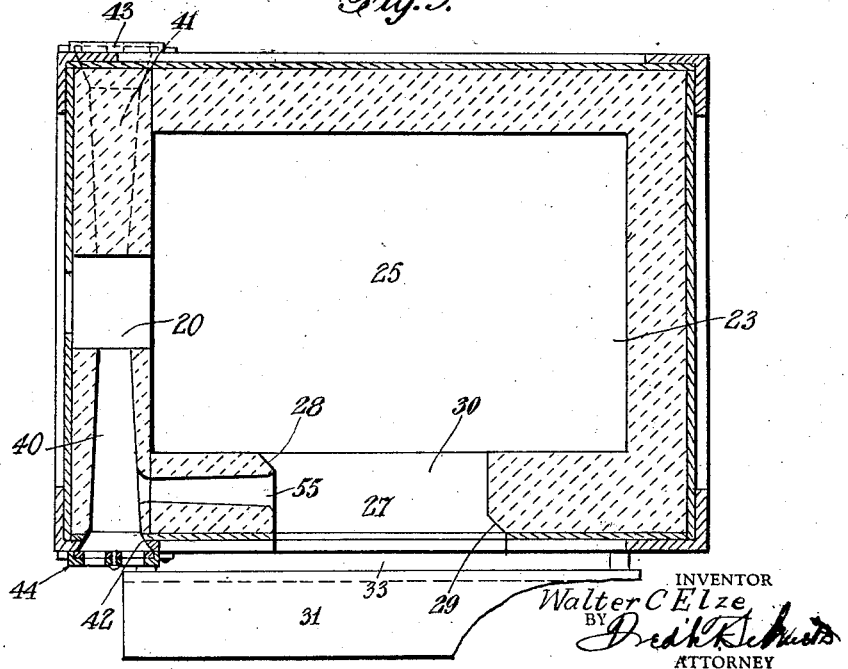

Patented June 12, 1928.

1,673,557

UNITED STATES PATENT OFFICE.

WALTER C. ELZE, OF FOREST HILLS, NEW YORK, ASSIGNOR TO HAUCK MANUFACTURING COMPANY, OF BROOKLYN, NEW YORK, A CORPORATION OF NEW YORK.

FORGE.

Application filed June 18, 1927. Serial No. 199,672.

The invention relates to forges, fired with gaseous fuel such as gas or oil and preferably the latter. A general object of the invention is to provide a supply of atomizing air in suitable volume and condition to afford a most effective combustion of the fuel so that an intense heat will be generated in the heating or combustion chamber of the forge; also, to direct the spent gases away from the mouth or charging opening of the forge. To this end, the invention contemplates a novel construction of forge and arrangement for preheating the incoming air as well as for affording a secondary supply of air supplementing the atomizing blast, or solely a gaseous heating medium for the same.

A further object of the invention resides in the particular manner of introducing the supplementary gaseous media whereby breaking up of the fuel of the blast is enhanced.

A still further object of the invention resides in the location of an intake for the supplementary gaseous media such that an appreciable cooling of the space in front of the mouth or charging opening of the forge will result; also, in the particular construction of said mouth or charging opening whereby the outgoing products of combustion or spent gases are deflected from the front of the same. The invention has for its object, furthermore, the provision of novel screening means for maintaining the space in front of the mouth comparatively cool.

Additional features of the invention will be hereinafter more fully set forth in connection with the description of the accompanying drawings, in which:

Fig. 4 is a vertical section through the heating chamber of the forge, taken on the line 4—4, Fig. 2, and looking in the direction of the arrows.

Fig. 5 is a fragmentary vertical section taken on the line 5—5, Fig. 3, and looking in the direction of the arrows.

Fig. 6 is a transverse section taken on the line 6—6, Fig. 2, and looking in the direction of the arrows.

Fig. 7 is a sectional view illustrating a modification in connection with the supply of secondary air.

Fig. 8 is a fragmentary front elevation of a modification setting forth an arrangement for supplying a heated gaseous medium; and Fig. 9 is a horizontal section thereof taken on the line 9—9, Fig. 8, and looking in the direction of the arrows.

Figure 1:
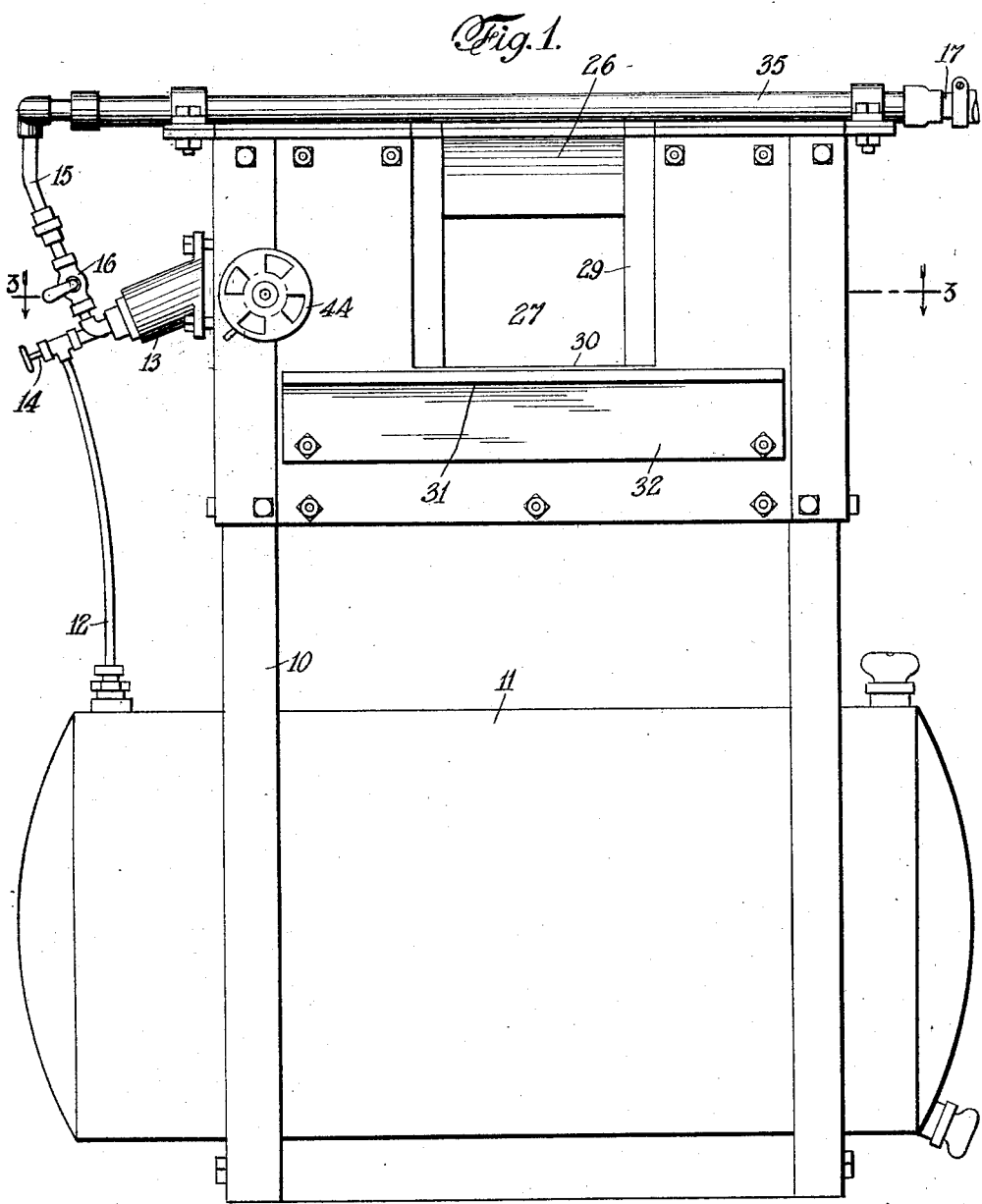
Fig. 1 is a front elevation of the novel forge.

Referring to the drawings, 10 designates a suitable supporting frame upon which the heating chamber and various related apparatus are supported, as well as a fuel tank 11, which may contain, for example, a supply of oil constituting the combustible for operating the forge. The said tank is provided with an outlet pipe 12 leading to a burner apparatus 13 of any well-known or special design and the supply of fuel is controllable through a valve 14. Similarly, the primary supply of air may be introduced to the burner 13 through a pipe connection 15 in which is included a controlling valve 16, said pipe being connected through a hose 17 with a suitable supply of air (not shown) under the desired pressure.

The burner apparatus 13 is designed to discharge the mixture of fuel and air, through its nozzle 18, into an opening or throat 20 in the side or end wall 21 of the forge; and is, furthermore, preferably displaced behind said opening 20 so that a secondary supply of air will be induced to flow into the heating chamber when the burner is in operation and the same will also be more or less preheated in passing through the opening 20. It is desirable, also, to incline upwardly the said nozzle so as to direct the blast or jet of atomizing fuel toward the roof 22 of the heating chamber 23 of the said forge and wherein the resulting flame is whirled around to heat material or articles, such as rivets 24 and the like, on the bottom or hearth 25 of the said forge. The roof to this end may be arched or curved, as shown, in a plane perpendicular to the incoming jet, the inner arch-forming wall not extending, however, to the bottom of the forge and being displaced from the front wall thereof to provide a flue 26 through which the spent gases comprising the products of combustion and more or less of the flame are delivered. The front wall, moreover, is cut down at the middle portion and from the top edge to provide the mouth or charging opening 27 of the forge, which mouth is designed to permit of the insertion and removal of the articles to be heated respectively into and from the heating chamber 23. It is to be noted, also, that the inner near edge 28 of the front wall forming the said mouth is beveled as well as the diagonally opposite edge 29 of the other wall of said mouth, while the other respective outer and inner edges remain squared. Any tendency of the products of combustion to pass through the mouth at the wall edges will be checked by inward reflection thereof by said beveled edge 28 and discharged through said flue, while the beveling of the edge 29 enlarges the vision through said mouth into the heating chamber. The mouth at its rear wall portion is preferably rounded or beveled at the top as shown to better divert the products of combustion away from the front of said mouth.

Furthermore, there is located before said mouth and substantially on a level with the sill 30 thereof, a working platform 31 in the nature, for example, of an angle piece, as shown; but the same is arranged to have its downwardly directed portion 32 displaced from the front of the forge to afford thereby a flue 33 through which a flow of cooling air is induced when the forge is in operation. This will provide for a vertical screen or curtain of air before the mouth 27 which will further protect an operator against burning in manipulating the material to be heated in the said forge.

In accordance with the invention, provision is made for heating the incoming primary air furnished the burner; and to this end, there is included between the hose connection 17 and the pipe connection 15 a preheating member which may be in the nature of a pipe 35 or coil of pipes. The latter is secured to the top of the forge and disposed above the flue 26 and preferably at the inner rounded side thereof, so that the said incoming air may be exposed to the temperature of the outgoing products of combustion and flame. By this expedient, the temperature of the incoming air is considerably elevated which greatly enhances the combustion in the heating chamber and results in an extremely high temperature being attained therein. Moreover, it will be noted that before entering the burner the incoming fuel supply and the incoming air supply are located adjacent to each other at the burner apparatus whereby a portion of the heat of the preheated air is communicated to the fuel so that the latter is more or less preheated thereby which further improves the combustion of the said oil in the heating chamber.

In addition to the primary source of air supply, it has been found that the combustion may be further considerably improved, quieter operation attained and the necessary atomizing pressure of the primary air supply considerably reduced if a secondary and preheated supply of air be afforded in the manner hereinafter set forth. That is to say, provision is made for introducing through wall 21 and from one or both sides of the opening 20 therein additional air as through horizontally disposed ducts 40 and 41, said ducts extending through the said corresponding end wall 21 of the forge to the outer surfaces thereof. The air passing through said ducts will thereby also be preheated and further tend to improve the combustion and temperature attainable in the heating chamber. As shown more clearly in Figs. 4-6 of the drawings, the ducts 40 and 41 are tapered inwardly from inlet openings 42 and 43, respectively in the rear and front wall of the forge, to reduce the noise of the inrushing air; and the axes of the ducts are arranged to lie in a plane substantially perpendicular to the plane of the burner axis. Furthermore, it is preferred to displace these ducts in their vertical plane so that they will enter the opening 20 substantially at the uppermost and lowermost portion thereof and generally in a tangential direction, whereby a whirling motion of the incoming secondary air is produced about the incoming blast tending thereby to improve the mixing of the fuel and air as well as to impart a generally whirling motion to the same in the heating chamber. Suitable shutters 44 and 45, or devices for controlling the incoming air, may be provided at the corresponding inlets and whereby conditions may be regulated to suit.

Figure 2:
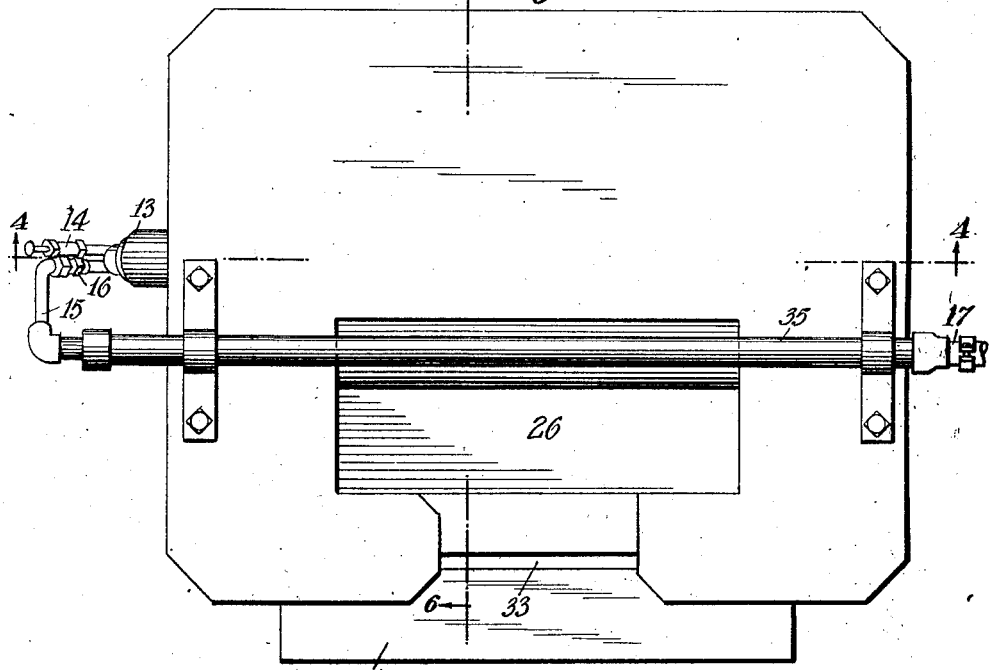
Fig. 2 is a plan thereof.
Figure 3:
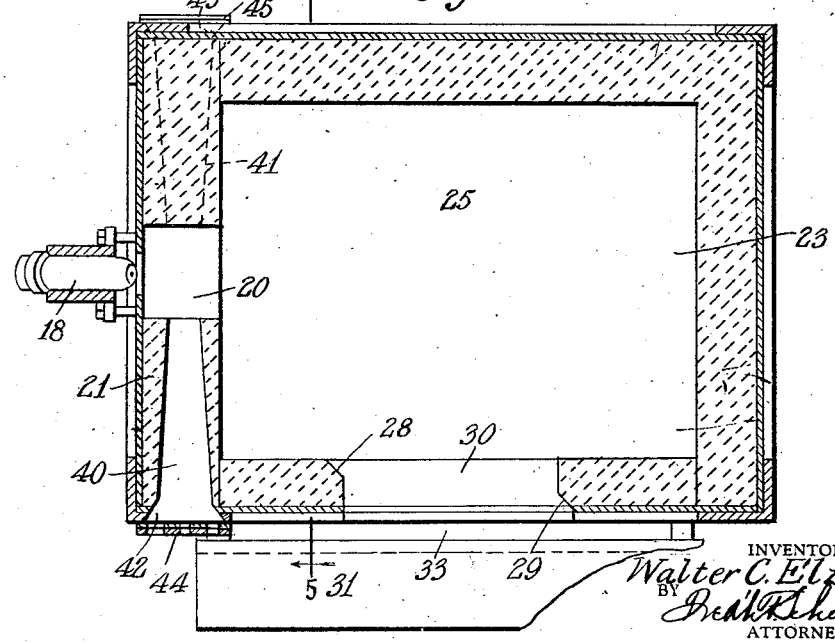
Fig. 3 is a horizontal section through the forge taken on the line 3—3, Fig. 1, and looking in the direction of the arrows.

In Fig. 7, a modification in connection with the introduction of the secondary air is illustrated, a single and main inlet duct 46 merely being employed from the front or rear of the end wall 47 of the force; and the said duct discharges substantially tangentially into a circular chamber 48 surrounding an annular inlet portion 49 through which extends centrally an opening 50 corresponding to the opening 20 of the form indicated in the Figs. 1-6. A plurality of secondary communicating ducts 51 are provided in the annular member 49 and are directed substantially tangentially into the opening 50 to afford communication between the circular space 48 and the said opening. In this manner, the whirling motion is considerably enhanced and tends to further improve the combustion.

Referring to Figs. 8 and 9, a still further modification in the general arrangement indicated in Figs. 1-6 is shown, the same comprising a longitudinal connection 55 between one of the lateral ducts 40 or 41 to the heating chamber 23 itself. Moreover, a shutter member 44 is provided over the corresponding inlet, as the inlet 42, so that, if desired, the air supply at this point may be entirely shut off or regulated to suit the requirements. In any event, arrangement is made for introducing more or less of the highly heated spent gases into the opening 20 and thus further preheat the combustible mixture; and I have found it preferable to provide the inlet for the waste gas supplying duct 55 through the front wall and in proximity to the mouth 27, so that the gases withdrawn are at an extremely high temperature; and their withdrawal, furthermore, does not affect the temperature prevailing in the heating chamber. If an air supply is introduced therewith through the duct 40 it will, of course, be appreciated that this air supply will be considerably preheated and the proportions of air and gas may be varied by correspondingly adjusting the shutter 44, although it will be understood that the shutter may be closed entirely so that only the heated gases are supplied; but some will mix with the secondary air supplied through the opposite duct 41 as well as with the supply of primary air and the further secondary air about the burner.

By furnishing a secondary supply of air in the manner set forth above and induced by the incoming flow of combustible mixture, and preferably in preheated state, it has been found possible to operate the forge with the primary air supply under pressures as low as from three to six pounds per square inch, thereby not only appreciably reducing the cost of operation but also making for much quieter operation of the forge. Moreover, the reduction of the actual quantity of air employed lessens oxidation of the material heated in the forge.

It will be understood that the secondary supply of air may be induced either from the space immediately behind the opening in the side wall of the forge, or at the front and rear walls in the provision of the ducts passing therethrough, or from both sources. In the case of the secondary air being brought through the ducts in the side wall, not only is the same heated to a comparatively high temperature, but overheating of the material composing said wall is insured against and is life thereby materially increased.

By affording the secondary air under a comparatively high temperature, either with or without intermixture of a portion of the products of combustion, the additional heat furnished thereby materially assists the combustion and affords a quieter operation due to the more equal temperature of the fuel and air in the mixture. As a result of thus supplying waste heat units to the combustible mixture, the amount of fuel required is also appreciably reduced and the operation of the furnace may be most economically conducted.

Furthermore, by the particular arrangement of the mouth and air screen before the same, the operation of inserting or removing material from the interior of the forge may be conducted with minimum discomfort to the operator.

I claim:

1. A forge comprising a casing of refractory material having an arched roof with inner wall terminating above the bottom of the casing and displaced from the front wall thereof to afford a flue for spent gases, the front wall being cut away to provide a charging opening or mouth of the forge and said casing having an inlet throat or opening in a side wall; and a burner member to direct a blast of fuel and air into the heating chamber through said throat.

2. A forge comprising a casing of refractory material having an arched roof with inner wall terminating above the bottom of the casing and displaced from the front wall thereof to afford a flue for spent gases, the front wall being cut away to provide a charging opening or mouth of the forge and said casing having an inlet throat or opening in a side wall; a burner member to direct a blast of fuel and air into the heating chamber through said throat; and a pipe secured to the top of the casing over said flue to preheat the air supplied to the burner.

3. A forge comprising a casing of refractory material having an arched roof with inner wall terminating above the bottom of the casing, rounded at its upper surface and displaced from the front wall to afford a flue for spent gases, the front wall being cut away to provide a charging opening or mouth of the forge and said casing having an inlet throat or opening in a side wall; and a burner member to direct a blast of fuel and air into the heating chamber through said throat.

4. A forge comprising a casing of refractory material having an arched roof with inner wall terminating above the bottom of the casing, rounded at the upper surface and displaced from the front wall to afford a flue for spent gases, the front wall being cut away to provide a charging opening or mouth of the forge and said casing having an inlet throat or opening in a side wall being rounded; and a burner member to direct a blast of fuel and air into the heating chamber through said throat, the inner edge of the near side of said mouth being beveled.

5. A forge comprising a casing of refractory material having an arched roof with inner wall terminating above the bottom of the casing, rounded at the upper surface and displaced from the front wall to afford a flue for spent gases, the front wall being cut away to provide a charging opening or mouth of the forge and said casing having an inlet throat or opening in a side wall being rounded; and a burner member to direct a blast of fuel and air into the heating chamber through said throat, the inner edges of the near side and the outer edge of the far side of said mouth being beveled while the opposite edges thereof are square.

6. A forge comprising a casing of refractory material affording a heating chamber having an inlet throat or opening and a mouth to permit manipulation of material within the heating chamber; a burner member associated with the forge and adapted to direct a blast of fuel and air into the heating chamber through said throat, and the said throat for the introduction of the blast having communication with the external air to afford a secondary supply of preheated air about the said blast.

7. A forge comprising a casing of refractory material affording a heating chamber having an inlet throat or opening and a mouth to permit manipulation of material within the heating chamber; a burner member associated with the forge and adapted to direct a blast of fuel and air into the heating chamber through said throat, and the forge portion provided with the throat for the introduction of said blast having ducts extending from opposite sides thereof and affording communication between said throat and the external air.

8. A forge comprising a casing of refractory material affording a heating chamber having an inlet throat or opening and a mouth to permit manipulation of material within the heating chamber; a burner member associated with the forge and adapted to direct a blast of fuel and air into the heating chamber through said throat, and the forge portion provided with the throat for the introduction of said blast having ducts extending therethrough and directed tangentially thereto from opposite sides thereof in different planes.

9. A forge comprising a casing of refractory material affording a heating chamber having an inlet throat or opening and a mouth to permit manipulation of material within the heating chamber; a burner member associated with the forge and adapted to direct a blast of fuel and air into the heating chamber through said throat and the throat for the introduction of said blast having communication with the external air to afford a secondary supply of preheated air about the said blast, and means to control the said secondary supply.

10. A forge comprising a casing or refractory material affording a heating chamber having an inlet throat or opening and a mouth to permit manipulation of material within the heating chamber; a burner member associated with the forge and adapted to direct a blast of fuel and air into the heating chamber through said throat and the forge portion provided with the throat for the introduction of said blast having ducts extending from opposite sides thereof and affording communication between said throat and the external air, and one of said ducts communicating with the mouth of the forge.

11. A forge comprising a casing of refractory material affording a heating chamber having an inlet throat or opening and a mouth to permit manipulation of material within the heating chamber; a burner member associated with the forge and adapted to direct a blast of fuel and air into the heating chamber through said throat and the throat for the introduction of said blast having communication with the mouth of the forge.

12. A forge comprising a casing of refractory material affording a heating chamber having an inlet throat or opening and a mouth to permit manipulation of material within the heating chamber; a burner member associated with the forge and adapted to direct a blast of fuel and air into the heating chamber through said throat and the forge portion provided with the throat for the introduction of said blast having ducts extending from opposite sides thereof and affording communication between said throat and the external air, and one of said ducts communicating with the mouth of the forge, and means to control the communication of said latter duct with the air.

13. A forge comprising a casing of refractory material affording a heating chamber and having an inlet throat or opening and a mouth to permit manipulation of material within the heating chamber; a working platform located in front of said mouth substantially on a level with the sill of said mouth and having a portion depending from its inner edge and displaced from the mouth wall to provide a flue for affording an air screen or curtain before the said mouth when the forge is in operation; and a burner member to direct a blast of fuel and air into the heating chamber through said throat.

In testimony whereof I affix my signature.

WALTER C. ELZE.